United States Patent

Seide

Patent Number: 5,892,960
Date of Patent: Apr. 6, 1999

[54] METHOD AND COMPUTER SYSTEM FOR PROCESSING A SET OF DATA ELEMENTS ON A SEQUENTIAL PROCESSOR

[75] Inventor: Frank Seide, Aachen, Germany

[73] Assignee: U.S. Philips Corporation, New York, N.Y.

[21] Appl. No.: 822,816

[22] Filed: Mar. 24, 1997

[30] Foreign Application Priority Data

Mar. 28, 1996 [EP] European Pat. Off. ............. 96200853

[51] Int. Cl.$^6$ .................................................. G06F 12/00
[52] U.S. Cl. ...................................... 395/800.07; 704/231
[58] Field of Search ..................... 395/800.01, 800.22, 395/800.21, 800.07; 704/200, 231

[56] References Cited

U.S. PATENT DOCUMENTS

| | | | |
|---|---|---|---|
| 4,722,049 | 1/1988 | Lahti .................................. | 395/800.03 |
| 4,745,547 | 5/1988 | Buchhoiz et al .................. | 395/800.04 |
| 5,063,497 | 11/1991 | Catler et al. ...................... | 395/800.07 |
| 5,237,702 | 8/1993 | Hayashi et al. ................... | 395/800.07 |
| 5,423,051 | 6/1995 | Fuller et al. ....................... | 395/800.07 |
| 5,448,746 | 9/1995 | Eickemeyer et al. .................. | 395/800 |
| 5,608,840 | 3/1997 | Tsuboka et al. .................. | 704/236 |
| 5,619,709 | 4/1997 | Caid et al. ........................ | 707/532 |
| 5,638,489 | 6/1997 | Tsuoka et al ..................... | 704/256 |
| 5,673,407 | 9/1997 | Poland et al. ..................... | 395/563 |
| 5,754,681 | 5/1998 | Watanabe et al. ................. | 382/159 |

OTHER PUBLICATIONS

"A Tutorial on Hidden Markov Models and Selected Applications in Speech Recognition", by Lawrence R. Rabiner, Proc. of the IEEE, Vol. 77, No. 2, Feb. 1989, pp. 257–286.

*Primary Examiner*—David Y. Eng
*Attorney, Agent, or Firm*—Daniel E. Tierney

[57] ABSTRACT

The method and system are used to process a set of data elements, such as components of vectors used in pattern recognition, in parallel on a conventional sequential processor 30. A group of data elements is loaded into a data register of the processor 30 as a compound data element. The data register is operated on using a conventional processor instruction, such as an addition, subtraction or multiplication. The compound data element comprises an arrangement of at least two blocks, with each block comprising at the low order bit positions a data element and at the high order bit position(s) at least one separation bit. The separation bits are assigned predetermined bit values ensuring that during a processor operation the desired parallel result is formed.

30 Claims, 7 Drawing Sheets

| '01' | $x_4$ | '01' | $x_3$ | '01' | $x_2$ | '01' | $x_1$ | $X \oplus M$

− | '00' | $y_4$ | '00' | $y_3$ | '00' | $y_2$ | '00' | $y_1$ | $Y$

= | $d_4 + 2^d$ | $d_3 + 2^d$ | $d_2 + 2^d$ | $d_1 + 2^d$ | $X \oplus M - Y = D \oplus M$

⊕ | '01' | 0 | '01' | 0 | '01' | 0 | '01' | 0 | $M$

= | $d_4$ | $d_3$ | $d_2$ | $d_1$ | $(D \oplus M) \oplus M = D$

FIG. 6

| '0' | $d_4$ | '1' | $d_3+2^{h-1}$ | '0' | $d_2$ | '1' | $d_1+2^{h-1}$ | D

AND | '1' | '0...0' | '1' | '0...0' | '1' | '0...0' | '1' | '0...0' | $M_1$

| $d_4$ | $d_3$ | $d_2$ | $d_1$ | D

|      |       |      |       |      |       |      |       |       |
|------|-------|------|-------|------|-------|------|-------|-------|
| '00' | $x_4$ | '00' | $x_3$ | '00' | $x_2$ | '00' | $x_1$ | $X_1$ |

+

|      |       |      |       |      |       |      |       |       |
|------|-------|------|-------|------|-------|------|-------|-------|
| '00' | $x_8$ | '00' | $x_7$ | '00' | $x_6$ | '00' | $x_5$ | $X_2$ |

+

|      |          |      |          |      |          |      |       |       |
|------|----------|------|----------|------|----------|------|-------|-------|
| '00' | $x_{12}$ | '00' | $x_{11}$ | '00' | $x_{10}$ | '00' | $x_9$ | $X_3$ |

+

|      |          |      |          |      |          |      |          |       |
|------|----------|------|----------|------|----------|------|----------|-------|
| '00' | $x_{16}$ | '00' | $x_{15}$ | '00' | $x_{14}$ | '00' | $x_{13}$ | $X_4$ |

=

| $x_4+x_8+x_{12}+x_{16}$ | $x_3+x_7+x_{11}+x_{15}$ | $x_2+x_6+x_{10}+x_{14}$ | $x_1+x_5+x_9+x_{13}$ |
|---|---|---|---|

FIG. 9

| $x_8$ | $x_7$ | $x_6$ | $x_5$ | $x_4$ | $x_3$ | $x_2$ | $x_1$ | X |
|-------|-------|-------|-------|-------|-------|-------|-------|---|

|   | $x_7$ |   | $x_5$ |   | $x_3$ |   | $x_1$ | $X_1$ |
|---|-------|---|-------|---|-------|---|-------|-------|

| $x_8$ |   | $x_6$ |   | $x_4$ |   | $x_2$ |   | $X'_2$ |
|-------|---|-------|---|-------|---|-------|---|--------|

|   | $x_8$ |   | $x_6$ |   | $x_4$ |   | $x_1$ | $X_2$ |
|---|-------|---|-------|---|-------|---|-------|-------|

FIG. 10

| | | | | | | | | |
|---|---|---|---|---|---|---|---|---|
| | $x_8$ | $x_7$ | $x_6$ | $x_5$ | $x_4$ | $x_3$ | $x_2$ | $x_1$ | $X_1$ |

| | | | | | | | | |
|---|---|---|---|---|---|---|---|---|
| + | | | | | $x_8$ | $x_7$ | $x_6$ | $x_5$ | $X_2$ |

| | | | | | | | | |
|---|---|---|---|---|---|---|---|---|
| = | $x_8$ | $x_7$ | $x_6$ | $x_5$ | $x_4+x_8$ | $x_3+x_7$ | $x_2+x_6$ | $x_1+x_5$ | $X_3$ |

| | | | | | | | | |
|---|---|---|---|---|---|---|---|---|
| + | | | $x_8$ | $x_7$ | $x_6$ | $x_5$ | $x_4+x_8$ | $x_3+x_7$ | $X_4$ |

| | | | | | | | | |
|---|---|---|---|---|---|---|---|---|
| = | $x_8$ | $x_7$ | $x_6+x_8$ | $x_5+x_7$ | $x_4+x_6+x_8$ | $x_3+x_5+x_7$ | $x_2+x_4+x_6+x_8$ | $x_1+x_3+x_5+x_7$ | $X_5$ |

| | | | | | | | | |
|---|---|---|---|---|---|---|---|---|
| + | | $x_8$ | $x_7$ | $x_6+x_8$ | $x_5+x_7$ | $x_4+x_6+x_8$ | $x_3+x_5+x_7$ | $x_2+x_4+x_6+x_8$ | $X_6$ |

| | | | | | | | | |
|---|---|---|---|---|---|---|---|---|
| | $x_8$ | $x_7+x_8$ | $x_6+x_7+x_8$ | $x_5+x_6+x_7+x_8$ | $x_4+x_5+x_6+x_7+x_8$ | $x_3+x_4+x_5+x_6+x_7+x_8$ | $x_2+x_3+x_4+x_5+x_6+x_7+x_8$ | $x_1+x_2+x_3+x_4+x_5+x_6+x_7+x_8$ | $X_7$ |

FIG. 11

| $x_7$ | $x_6$ | $x_5$ | $x_4$ | $x_3$ | $x_2$ | $x_1$ | $X_1$ |

| | | | $x_7$ | $x_6$ | $x_5$ | $x_4$ | $X_2$ |

FIG. 12

| $x_{10}$ | $x_9$ | $x_8$ | $x_7$ | $x_6$ | $x_5$ | $x_4$ | $x_3$ | $x_2$ | $x_1$ | $X_1$ |

+

| | | | | | | | | $x_{10}$ | $x_9$ |

=

| $x_{10}$ | $x_9$ | $x_8$ | $x_7$ | $x_6$ | $x_5$ | $x_4$ | $x_3$ | $x_2+x_{10}$ | $x_1+x_9$ |

FIG. 13

| 0 | $x_4$ | 0 | $x_3$ | 0 | $x_2$ | 0 | $x_1$ |   $\times$   | 0 | $y_1$ | 0 | $y_2$ | 0 | $y_3$ | 0 | $y_4$ |

$C_1$ $\qquad\qquad\qquad\qquad$ $C_2$ $\downarrow$

| $x_4 y_1$ | $x_4 y_2 + x_3 y_1$ | $x_4 y_3 + x_3 y_2 + x_2 y_1$ | $x_4 y_4 + x_3 y_3 + x_2 y_2 + x_1 y_1$ | $x_3 y_4 + x_2 y_3 + x_1 y_2$ | $x_2 y_4 + x_1 y_3$ | $x_1 y_1$ |

FIG. 14

METHOD AND COMPUTER SYSTEM FOR PROCESSING A SET OF DATA ELEMENTS ON A SEQUENTIAL PROCESSOR

FIELD OF THE INVENTION

The invention relates to a method for processing a set of data elements in a computer system comprising a sequential processor; each data element comprising a plurality of d data bits; the processor operating on an instruction-specific number of operands stored in individual ones of a plurality of data registers; at least one operand having a width of w bits; the method comprising:

a. selecting at least one data element from the set of data elements, b. for each selected data element selecting one of the data registers and loading the selected data element into the selected data register, c. instructing the processor to operate on the selected data register(s), and d. repeating steps a. to c. until all data elements of the set have been operated on, The invention also relates to a computer system for processing a set of data elements; each data element comprising a plurality of d data bits; the system comprising memory means and a sequential processor operating on an instruction-specific number of operands stored in individual ones of a plurality of data registers; at least one operand having a width of w bits; the processor being operative to perform the following steps under control of a program stored in the memory means:

a. selecting at least one data element from the set of data elements, b. for each selected data element selecting one of the data registers and loading the selected data element into the selected data register, c. operating on the selected data register(s), and d. repeating steps a. to c. until all data elements of the set have been operated on,

DESCRIPTION OF THE RELATED ART

Such a method and computer system are generally used, for instance, for pattern recognition. Pattern recognition, such as speech recognition or image recognition, is increasingly getting important. Particularly, speech recognition has recently been widely applied to areas such as Telephone and telecommunications (various automated services), Office and business systems (data entry), Manufacturing (hands-free monitoring of manufacturing processes), Medical (annotating of reports), Games (voice input), voice-control of car functions and voice-control used by disabled people. For continuous speech recognition, the following signal processing steps are commonly used, as illustrated in FIG. 1 [refer L. Rabiner "A Tutorial on Hidden Markov Models and Selected Applications in Speech Recognition", Proceeding of the IEEE, Vol. 77, No. 2, February 1989]:

Feature analysis: the speech input signal is spectrally and/or temporally analyzed to calculate a representative vector of features (observation vector $\bar{o}$).

Typically, the speech signal is digitised (e.g. sampled at a rate of 6.67 kHz.) and pre-processed, for instance by applying pre-emphasis. Consecutive samples are grouped (blocked) into frames, corresponding to, for instance, 32 msec. of speech signal. Successive frames partially overlap, for instance, 16 msec. Often the Linear Predictive Coding (LPC) spectral analysis method is used to calculate for each frame a representative vector of features (observation vector $\bar{o}$). The feature vector may, for instance, have 24, 32 or 63 components (the feature space dimension).

Unit matching system: the observation vectors are matched against an inventory of speech recognition units. Various forms of speech recognition units may be used. Some systems use linguistically based sub-word units, such as phones, diphones or syllables, as well as derivative units, such as fenenes and fenones. Other systems use a whole word or a group of words as a unit. The unit matching system matches the observation vectors against all sequences of speech recognition units and provides the likelihoods of a match between the vector and the sequences.

The so-called hidden Markov, model (HMM) is widely used to stochastically model speech signals. Using this model, each speech recognition unit is typically characterised by an HMM, whose parameters are estimated from a training set of speech data. For large vocabulary speech recognition systems involving, for instance, 10,000 to 60,000 words, usually a limited set of, for instance 40, sub-word units is used, since it would require a lot of training data to adequately train an HMM for larger units. For speech, the observations represent continuous signals. The observations can be quantised to discrete symbols chosen from a finite alphabet of, for instance, 32 to 256 vectors. In such a case a discrete probability density can be used for each state of the model. In order to avoid degradation associated with quantising, many speech recognition systems use continuous observation densities. Generally, the densities are derived from log-concave or elliptically symmetric densities, such as Gaussian (normal distribution) or Laplacian densities. During training, the training data (training observation sequences) is segmented into states and the observation vectors for each state are clustered. Depending on the complexity of the system and the amount of training data, there may, for instance, be between 32 to 120 clusters for each state. Each cluster has its own density, such as a Gaussian density. The density is represented by a reference vector, such as a mean vector.

The likelihood calculation involves calculating in each state the distance of the observation (feature vector) to each reference vector, which represents a cluster. Particularly in large vocabulary speech recognition systems using continuous observation density HMMs, the likelihood calculation involves a large number of calculations. Using, for instance, 40 sub-word units, 5 states per sub-word unit and 64 clusters per state the likelihood calculation involves 12800 distance calculations between, for instance, 32 dimensional vectors. These calculations are repeated for each observation. Consequently, the likelihood calculation may consume 50%–75% of the computing resources.

Pattern recognition is typically performed on a conventional PC or workstation with a sequential microprocessor. Even using a state-of-the-art microprocessor the quality of the pattern recognition, as, for instance, influenced by the total number of clusters used in the system, is restricted in order to achieve real-time or near real-time pattern recognition.

SUMMARY OF THE INVENTION

It is an object of the invention to provide a method and computer system of the kind set forth with the potential of faster processing of a set of data elements such as, for instance, used in pattern recognition.

To achieve this object, the method according to the invention is characterised in that:

step a. comprises selecting at least one group of at least two distinct data elements from the set of data elements; and step b. comprises for each selected group selecting an individual one of the data registers, and loading the data elements of the group as a compound data element into the selected data register; the compound data element comprising for each data element of the group a corresponding block of at least d+s consecutive bits; the blocks being arranged at consecutive block locations of the compound data element and of each block d low order bit locations comprising the data bits of the corresponding data element and at least s high order bit locations comprising separation bits, each with a predetermined bit value, where $(d+s)*2 \leq w$.

Conventionally, a sequential processor operates on operands loaded into separate data registers. The operand is treated as one data element. The performance of sequential processors is increasing continuously. As an example, the number of instructions executed per second increases due to an increase in clock frequency and by using processor architectures which require less processing cycles per instruction, such as a RISC or superscalar implementation. Additionally, the word-size of the processor is increasing to, for instance, 32 or 64 bit. Since the size of the data element is determined by the application, an increasing number of applications do not benefit from the increase in word-size. Using 8-bit data elements, the likelihood calculation may perform equally well on an 8-bit processor as on an 32-bit processor if both processors would be able to execute the same number of instructions per second. Depending on the architecture of the processor, the 32-bit processor might even be slower if this processor would require additional time for conversion between 8-bit data and 32-bit words. Typically, processors which are able to perform a high number of instructions per second also have large word-sizes. The invention provides a way of also utilising the increase in word-size. Therefor, according to the invention, a compound data element, representing a group of data elements, is loaded into the data register. Using the same instruction as conventionally used to operate on one data element, the sequential processor is used to operate on the group of data elements in parallel. In order to ensure that during the operation the data elements do not inadvertently interfere with each other, for instance caused by carry bits or underflow/overflow situations, the compound data element is formed with separation bits in between the individual composing data elements. For pattern recognition, faster processing implies that the percentage of processing time required for the maximum likelihood calculation is reduced. This contributes to achieving real-time pattern recognition and also gives the potential to recognise patterns with a lower pattern error rate.

An embodiment according to the invention, wherein the data elements represent finite integers, is characterised in that the method comprises the step of converting the data elements of the set into finite positive integers by adding $2^{d-1}$ to each data element of the set. Conversion of the finite integers to positive finite integers simplifies the handling of the separation bits.

An embodiment according to the invention, wherein the computer system comprises memory means and the data elements being stored in the memory means, is characterised in that for at least one group the compound data element is stored in the memory means and that loading the data elements of the group as a compound data element into the selected data register comprises reading the compound data element from the memory means into the selected data register. By storing in advance a compound data element for the group of data elements, the compound data element can be loaded quickly. Advantageously, the data elements are stored in a form suitable for use as a compound data element. Preferably, the data elements are stored sequentially in the memory means with separation bits in between the data elements.

An alternative embodiment according to the invention is characterised in that the method comprises constructing the compound data element from the data elements of the corresponding group by for each data element of the group loading the data element into a first data register, repositioning the data element in the first data register or a temporary compound data element stored in a second data register over at least d+s bit positions, and combining the data element with the temporary compound data element in the second data register; and using the temporary compound data element as the compound data element.

In this embodiment, the compound data element is constructed from the corresponding data elements. This method may, advantageously, be used for systems where the data elements are supplied in real-time to the processor, requiring no additional memory for the data elements or the compound data elements.

An alternative embodiment according to the invention, wherein the set of data elements comprises a first and second subset of data elements, the first and second subset comprising equal numbers of data elements, is characterised in that a first compound data element corresponds to a group of data elements of the first subset of data elements, with an offset being added to each data element by at least one separation bit of each block of the first compound data element being set to a binary '1' value; in that a second compound data element corresponds to a group of data elements of the second subset of data elements with the separation bits of each block of the second compound data element being set to a binary '0' value; and in that the processor is instructed to form a subtracted compound data element by subtracting a data register loaded with the second compound data element from a data register loaded with the first compound data element; the subtracted compound data element comprising an arrangement of blocks corresponding to the arrangement of blocks of the first and second compound data element, with each block of the subtracted compound data element comprising at least one more data bit and at least one less separation bit than the corresponding block of the first and second compound data element.

In this way a parallel subtraction is achieved on a sequential processor. By setting a separation bit of the first compound data element to '1' it is avoided that negative numbers are formed during the subtraction, which otherwise would have resulted in neighbouring data elements influencing one another (a low order data element 'borrowing' a bit from a high order data element).

A further embodiment according to the invention is characterised in that setting the separation bits of a compound data element comprises instructing the processor to perform a bit-wise XOR operation on the compound data element with a predetermined mask of w bits. In this way the separation bits of all blocks of the compound data element are set in one operation.

A further embodiment according to the invention is characterised in that the method comprises selectively converting negative data elements of the subtracted compound data element to corresponding positive data elements. By converting the negative data elements, the absolute values of the data element of a compound data element are calculated in parallel. This may, advantageously, be used to calculate the $L_1$-norm of a vector or the $L_1$-distance of vectors.

A further embodiment according to the invention, wherein negative numbers are represented in a two's complement representation, is characterised in that the conversion comprises:

identifying which data elements of the subtracted compound data element are negative, by:
instructing the processor to perform a bit-wise AND operation on the subtracted compound data element with a first mask of w bits; the first mask comprising an arrangement of blocks corresponding to the arrangement of blocks of the subtracted compound data element, with of each block of the first mask the d+1-th bit being set to a binary '1' value and the remaining bits being set to a binary '0' value; and
instructing the processor to divide a resulting compound data element by $2^d$, forming a second mask of w bits; and converting the data elements of the subtracted compound data element, by:
instructing the processor to calculate a third mask, being the second mask multiplied by $2^{d+1}-1$; and
instructing the processor to perform a bit-wise XOR operation on the subtracted compound data element and the third mask, followed by adding up the second mask.

In this way the two's complement conversion of negative data elements is performed in parallel.

A further embodiment according to the invention, wherein the first and second subset of data elements represent respectively a first and second vector and wherein the method comprises calculating an $L_r$-distance between the first and second vector, is characterised in that the distance calculation comprises:

extracting each data element from the subtracted compound data element;
raising the extracted data elements to the power r and forming a sum by adding up the raised data elements.

After calculating the difference between the vectors in parallel and, optionally, the absolute value of the components of the difference vector, the components of the difference vector are individually processed further to determine the $L_r$-distance of the vectors.

An alternative embodiment according to the invention, wherein the computer system comprises memory means; the first and second subset of data elements represent, respectively, a first and second vector; and wherein the method comprises calculating an $L_r$-distance between the first and second vector, is characterised in that the calculation comprises:

extracting a data unit from the subtracted compound data element; the data unit comprising at least the data bits of a plurality of consecutive blocks; and
accessing a table stored in the memory means to retrieve an $L_r$ sub-norm for the data elements corresponding to the data bits which are part of the extracted data unit.

By using a table which for a combination of, for instance, two data elements provides an $L_r$ sub-norm, the $L_r$-distance can effectively be calculated using the compound data element.

A further embodiment according to the invention is characterised in that the method comprises:

selecting a plurality of said groups from the set;
instructing the processor to calculate a compound sum by:
for each group:
loading the data elements of the group as a group-specific compound data element into a selected data register, with the separation bits of each block of the group-specific compound data element being set to a binary '0' value; and
instructing the processor to add the selected data register to a data register comprising a temporary compound sum; the temporary compound sum being a compound data element comprising an arrangement of blocks corresponding to the arrangement of blocks in the group-specific compound data elements, with each block of the subtracted compound data element comprising at least one more data bit and at least one less separation bit than the corresponding block of the group-specific compound data elements; and
using the temporary compound sum as the compound sum.

In this way a parallel addition is achieved on a sequential processor.

A further embodiment according to the invention is characterised in that the method comprises creating more separation bits by splitting a compound data element into at least a first and a second compound data element. Using s separation bits, $2^s$ compound data elements can be added up in this way without neighbouring data elements interfering. By splitting the compound data element more separation bits can be created, allowing more compound data elements to be added up.

A further embodiment according to the invention is characterised in that splitting the compound data element into the first and the second compound data element comprises:

copying the compound data element to the second compound data element;
forming the first compound data element by removing blocks from the compound data element at a first selection of alternating block positions;
removing blocks from the second compound data element at a second selection of alternating block positions; the second selection being complementary to the first selection; and
shifting the first compound data element or the second compound data element over one block position.

This is an effective way of creating d more separation bits.

A further embodiment according to the invention is characterised in that the method further comprises calculating a total sum by extracting the blocks of the compound sum and adding up the extracted blocks. The total sum can be calculated by adding up the components of the compound sum.

An alternative embodiment according to the invention is characterised in that the method further comprises calculating a total sum; the calculation comprising:

determining the number n of blocks in the compound sum;
determining an integer number m which is substantially half of n;
copying the compound sum to a second compound sum;
shifting the compound sum or the second compound sum over m block positions in a first direction; and
summing the compound sum and the second compound sum to form a new compound sum with less data elements.

In this way, a number of data elements of the compound sum are added up in parallel, at the same time reducing the number of data elements in the compound sum.

A further embodiment according to the invention, wherein the computer system comprises memory means, is characterised in that the method further comprises calculating a total sum by:

extracting a data unit from the compound sum; the data unit comprising a plurality of consecutive blocks; and accessing a table stored in the memory means to retrieve a sum of the data elements which are part of the extracted data unit.

By using a table the total sum can be calculated effectively.

A further embodiment according to the invention, wherein the set of data elements comprises a first and second sub-set of data elements; the first and second subset comprising equal numbers of data elements and representing, respectively, a first and second vector; and the method comprising calculating an $L_2$-distance between the first and second vector, characterised:

in that a first compound data element corresponds to a group of k successive data elements of the first sub-set of data elements, with successive blocks of the first compound data element corresponding to successive data elements, and the number of separation bits in the blocks being at least d and the separation bits being set to a binary '0' value;

in that a second compound data element corresponds to a group of k successive data elements of the second set of data elements, with successive blocks of the second compound data element corresponding to successive data elements in reverse order, and the number of separation bits in the blocks being at least d and the separation bits being set to a binary '0' value;

in that the calculation comprises:

instructing the processor to multiply a data register loaded with the first compound data element with a data register loaded with the second compound data element, forming a multiplied compound data element; and extracting the k-th block from the multiplied compound data element.

By forming the compound data elements in this way, the multiplication results in forming at the k-th block position a cross-product which may, advantageously, be used for calculating the $L_2$-distance.

A further embodiment according to the invention is characterised in that the processor comprises a plurality of floating point data registers; in that the first and second compound data element are loaded into the mantissa of individual ones of the floating point data registers and in that the processor is instructed to form a multiplied compound data element by performing a floating point multiplication on the floating point registers loaded with the first and second compound data element. On certain processors with a faster floating point multiplication than integer multiplication, advantageously, the floating point unit is used for performing the multiplication.

A further embodiment according to the invention is characterised in that extracting the k-th block of the multiplied compound data element comprises:

while loading the first or second compound data element in the floating point data register, setting the exponent to $2^-n$, where n is the number of bits of the k-1 low order blocks of the multiplied compound data element;

converting the multiplied compound data element to an integer value; and extracting the low-order block from the integer value by masking.

By setting the exponent during the loading of the compound data element and maintaining the same exponent value during the multiplication an automatic shift over the required number of bit positions occurs during the conversion to an integer. This simplifies extracting the k-th block.

To achieve the object of the invention, the computer system according to the invention is characterised in that step a. comprises selecting at least one group of at least two distinct data elements from the set of data elements; and step b. comprises for each selected group selecting an individual one of the data registers, and loading the data elements of the group as a compound data element into the selected data register; the compound data element comprising for each data element of the group a corresponding block of at least d+s consecutive bits; the blocks being arranged at consecutive block locations of the compound data element and of each block d low order bit locations comprising the data bits of the corresponding data element and at least s high order bit locations comprising separation bits, each with a predetermined bit value, where $(d+s)*2 \leq w$.

These and other aspects of the invention will be apparent from and elucidated with reference to the embodiments shown in the drawings.

BRIEF DESCRIPTION OF THE DRAWINGS

FIG. 6 shows a parallel subtraction, FIG. 7 illustrates identifying negative data elements, FIG. 8 shows converting negative data elements to corresponding positive values, FIG. 9 shows a parallel addition, FIG. 10 illustrates creating more separation bits, FIG. 11 shows adding up components of a compound data element, FIG. 12 illustrates handling a compound data element with an odd number of blocks, FIG. 13 shows an alternative approach in handling a compound data element with an odd number of blocks, and FIG. 14 illustrates a parallel multiplication.

DETAILED DESCRIPTION OF THE INVENTION

Figure 1:
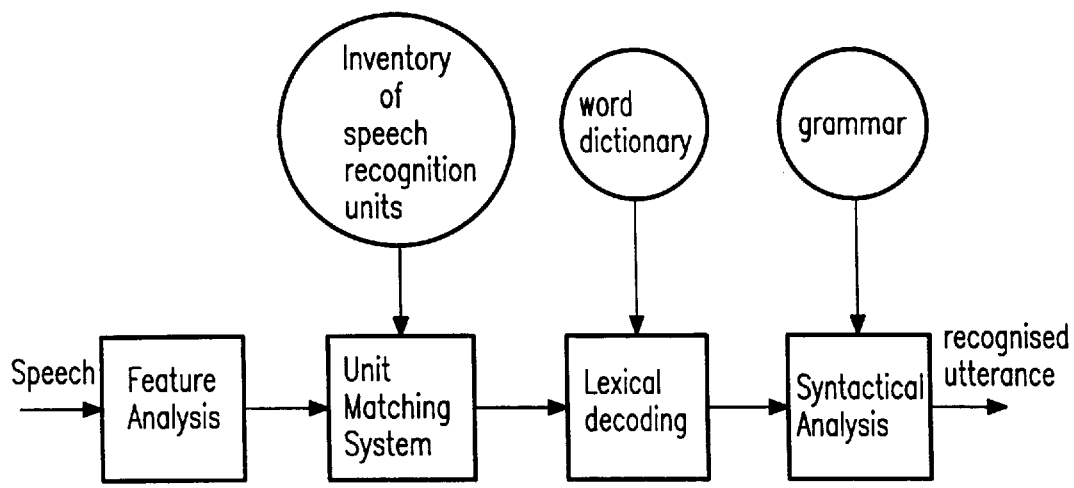
FIG. 1 illustrates the processing steps which are commonly used for continuous speech recognition.
Figure 2:
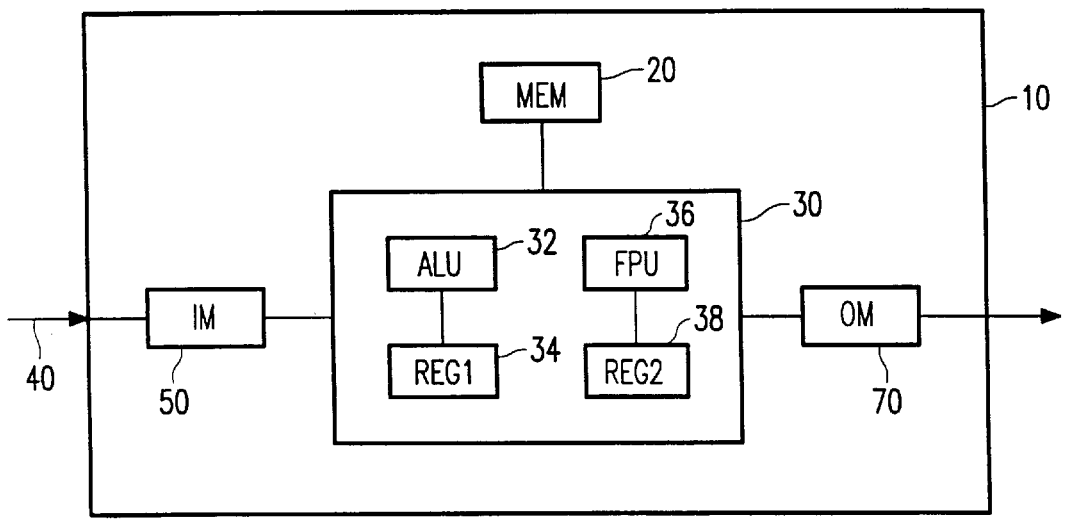
FIG. 2 shows a block-diagram of an embodiment of a system according to the present invention.

FIG. 2 shows a block diagram of a system 10 according to the invention. The system comprises memory means 20 and a processor 30. The memory means 20 stores a program for controlling the processor 30 according to the invention. Under control of the program the processor 30 processes a set of data elements. The data elements may be stored in the memory means 20 or, alternatively, be supplied in real-time, as will be described later in more detail. The data element comprises d data bits. Typically, each data element comprises the same number of data bits. The value of d is determined by the actual application. As will be described later in more detail, for speech processing systems, advantageously small size data elements of, for instance, 7 to 15 bits can be used. The memory means 20 is, typically, implemented using RAM. If required, the program or data elements may be retrieved from a background memory, such as a harddisk, CD-ROM or ROM, into the memory means 20. It will be appreciated that for the memory means 20 also a caching memory may be used. The processor 30 may be any type of sequential processor, as for instance used in PCs and workstation. The processor comprises a plurality of data registers. The processor 30 comprises an ALU 32 (arithmetic logical unit) and data registers 34. It will be understood that the processor may comprise many more means usually found in processors, such as a control unit, busses, other registers, a program cache and a data cache. Since such means are standard and do not form part of the invention, these means are not shown in the figure. The ALU 32 operates on operands stored in individual ones of the data registers. The number of operands (and, therefore, data registers) involved may be instruction-specific. The processor 30 has a word-size w, where w is at least twice as large as d+1. At least one of the operands has a width of w bits. For CISC-type processors the word-size may vary depending on the instruction; whereas for RISC-type processors the word-size, typically, is the same for all instructions. Modern microprocessors usually have word-sizes of 32 or 64 bits, with a trend towards 128 bits. Also, Digital Signal Processors (DSP) with a large word-size may be used.

The system is, typically, implemented using a conventional computer system, such as a PC or a workstation. As such, the system may comprise means usually found in such computer systems, like user input means, such as a keyboard or mouse, and user output means, such as a display. Since such means are standard and do not form part of the invention, these means are not shown in FIG. 2.

The system according to the invention may be used for many different applications. Advantageously, the invention is applied for applications where conventionally the same instruction is used repeatedly to sequentially process a large set of data elements. Examples of such applications are adding two rows of numbers, calculating a norm of a vector (implying adding components of the vector and, depending on the norm, calculating the absolute value and/or raising vector components to a power) and calculating a distance of vectors (implying subtracting components of the vectors, and calculating a norm of the resulting vector). According to the invention, the data elements are formatted and presented to the processor in such a manner that, using the same instruction, the processor performs the same operation as before but now on a number of data elements in parallel. To this end, at least two data elements are loaded into one data register in a non-overlapping manner. Since for instructions, such as adding, subtracting and multiplication, overflow/underflow or carries may occur, additional bits, referred to as separation bits, are used to separate the data elements in the data register. It is particularly beneficial to employ the system according to the invention for applications, such as audio and video processing, where relatively small size integers, such as 8 or 16 bit integers, are used for the data. More specifically, the system may be used for pattern recognition. In a pattern recognition system, a time-sequential input pattern 40 is derived from a continual physical quantity, such as speech or images. To this end, input means 50 recurrently accesses the physical quantity. For speech, this usually involves sampling the physical quantity at regular intervals, such as 6.67 kHz., 8 kHz., 11 kHz. or 16 kHz. and digitising the sample. The input means 50 processes a group of consecutive samples, corresponding to, for instance 32 msec. of speech signal, to provide a representative vector of features (the input observation vector $\bar{o}$). In this way a time sequence of input observation vectors is generated, which represents the input pattern. The components of the vectors are, typically, 8- or 16-bit integers. If required, good results may even be achieved using smaller integers, such as 7-bit integers, depending on the recognition model used.

Typically, the input means 50 may be implemented using a microphone, an A/D converter and a processor, such as a Digital Signal Processor (DSP). Also processor 30 may be used for this purpose. Optionally, the input means 50 may comprise a speech detector for effecting the sampling only when speech is effectively received. For real-time systems, the input means 50 may provide the sampled and digitised signal directly or, optionally, via the memory means 20 to the processor 30 for further processing. As an alternative, for instance for off-line systems, the input signal may have been stored in the memory means 20 in a digitised form or may be supplied digitally via a communication network. For pattern recognition, the input pattern is compared to reference patterns, which may be stored in the memory means 20. To this end, a reference pattern database may be used. The reference pattern database may be stored in the memory means 20 as an integrated database or, alternatively, as separate data files. As described earlier, speech recognition units are used as reference patterns for recognising speech. Each reference pattern comprises a sequence of reference units. Typically each reference unit is represented by at least one associated reference vector $\bar{\mu}$. The components of the vector form the data elements according to the invention. The structure of the reference patterns and the vector components are determined by the algorithms used for the pattern recognition. As an example, the vector components may be derived from the input samples using Linear Predictive Coding (LPC) and cepstral analysis. The unit matching may be based on dynamic programming or a statistical approach such as Hidden Markov Models.

Figure 3:
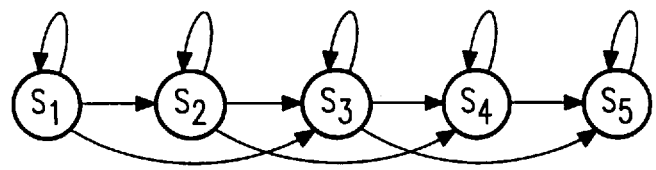
FIG. 3 shows an example of a left-right discrete Markov process.

Currently, speech recognition commonly uses Hidden Markov Models. A Hidden Markov Model is based on a discrete Markov process, describing a system which at any time is in one of a set of N distinct states. At regular times the system changes state according to a set of probabilities associated with the state. A special form of a discrete Markov process is shown in FIG. 3. In this so-called left-right model, the states proceed from left to right (or stay the same). This model is widely used for modelling speech, where the properties of the signal change over time. The model states can be seen as representing sounds. The number of states in a model for a sub-word unit could, for instance be, five or six. In which case a state, in average, corresponds to an observation interval. The model of FIG. 3 allows a state to stay the same, which can be associated with slow speaking. Alternatively, a state can be skipped, which can be associated with speaking fast (in FIG. 3 up to twice the average rate). The output of the discrete Markov process is the set of states at each instance of time, where each state corresponds to an observable event. For speech recognition systems, the concept of discrete Markov processes is extended to the case where an observation is a probabilistic function of the state. This results in a double stochastic process. The underlying stochastic process of state changes is hidden (the hidden Markov model, HMM) and can only be observed through a stochastic process that produces the sequence of observations. For pattern recognition, each reference pattern is modelled by a Hidden Markov Model, where the states of the model correspond to a reference unit. It should be noted that it is known to use a one-state Hidden Markov Model for modelling special patterns which do not have a clear time-sequential behaviour, such as the pattern for silence occurring before or in between words. For the purpose of this invention, such patterns are not described separately. Using continuous observation densities, such as Gaussian or Laplacian densities, the reference vectors correspond to the mean vectors of the densities.

The system 10 of FIG. 2 further comprises a localizer for locating in the memory 20 a reference pattern which corresponds to the input pattern. The localizer may be implemented using the processor 30. The located reference pattern is referred to as the recognised reference pattern. As described earlier, for Hidden Markov Models this involves calculating a likelihood of the observation vector. For each Hidden Markov Model and each state s of the model, the likelihood of an observation vector $\bar{o}$ is given by:

$$p(\bar{o}) = \sum_{k=1}^{N} w(k) \cdot p(\bar{o}|k)$$

where w(k) is the weight of the k-th observation mixture density (cluster) and N is the number of clusters for a state. For simplicity, the state s is not shown in the formula. Speech recognition systems usually use Laplacian or Gaussian probability densities to model the probability distribution of a cluster. The probability for these densities can be expressed using the $L_r$-norm. The $L_r$-norm is defined as:

$$d_r(\bar{x}, \bar{y}) = \|\bar{x} - \bar{y}\|_r = \left( \sum_{i=1}^{D} |x_i - y_i|^r \right)^{\frac{1}{r}}$$

where the $L_1$-norm is used for Laplacian densities and the $L_2$-norm is used for Gaussian densities. Using the $L_r$-norm, one of the possible formulas for the probability is:

$$p(\bar{o}) = \sum_{k=1}^{N} w(k) \cdot a \cdot e^{-b\|\bar{o}-\bar{\mu}(k)\|_r^r}$$

where the reference vector $\bar{\mu}(k)$ is the mean vector of the k-th observation mixture density. The coefficients a and b ensure that the probability integrates up to 1 if the observation vector $\bar{o}$ is ran over all possible values. Various forms or extensions of this formula are well known. As an example, the following three Gaussian densities are given:

full covariance matrix $K_{s,k}$: $p(\bar{o}|k) =$ $$\frac{1}{\sqrt{(2\pi)^D \det K_{s,k}}} \cdot e^{-\frac{1}{2} (\bar{o}-\bar{\mu}_{s,k})^T K_{s,k}^{-1} (\bar{o}-\bar{\mu}_{s,k})}$$

Diagonal covariance matrix $(K_{s,k})_{dd} =$ $$\sigma_d^2: p(\bar{o}|k) = \frac{1}{\sqrt{(2\pi)^D \prod_{k=1}^{D} \sigma_k^2}} \cdot e^{-\frac{1}{2} \sum_{k=1}^{D} (o-\mu_k)^2/\sigma_k^2}$$

Scalar variance $K_{s,k} = I \cdot \sigma_{s,k}^2$: $p(\bar{o}|k) = \frac{1}{\sqrt{(2\pi)^D (\sigma_k^2)^D}} \cdot e^{-\frac{1}{2\sigma_k^2} \|\bar{o}-\bar{\mu}_k\|_2^2}$ It will be appreciated that also other distance measures than the $L_r$-norm may be used.

Advantageously, the observation vector $\bar{o}$ and the mean vectors $\bar{\mu}(k)$ are scaled, for instance by multiplying the vectors with a diagonal matrix. Scaling can be used to prevent that terms fall below the precision range of the processor and to normalise the vectors according to the variance of the density. Advantageously, the reference vectors are scaled in advance and the observation vector is only scaled once before starting the actual likelihood calculations.

Due to the nature of the densities, the sum of probabilities can be approximated by the maximum, i.e. the density which contributes the largest probability. This implies that a key step in locating a reference pattern which corresponds to the input pattern is finding the reference vector which is nearest the observation vector (nearest neighbour search): By taking the logarithm, this gives:

$$p(\bar{o}) \approx \max\{w(k) \cdot a \cdot e^{-b\|\bar{o}-\bar{\mu}(k)\|_r^r} | k=1, \ldots, N\}$$

$$\log (p(\bar{o})) \approx -\min\{b\|\bar{o}-\bar{\mu}(k)\|_r^r - \log (w(k)) | k=1, \ldots, N\} - \log (a)$$

The constant log(a) can be ignored. As an alternative to separately subtracting the term log(w(k)), new extended vectors $\bar{p}$ and $\bar{q}(k)$ may be introduced, defined by:

$$\bar{p}^T = (b\bar{o}^T, 0)$$

$$\bar{q}(k)^T = (b\bar{\mu}^T, (-\log (w(k)))^{1/r})$$

In this formula it should be noted that $-\log(w(k)) > 0$. Using the extended vectors gives:

$$\log (p(\bar{o})) \approx -\min\{\|\bar{p} - \bar{q}(k)\|_r^r | k=1, \ldots, N\} - \log (a)$$

Since, $\bar{p}$ and $\bar{q}(k)$ have one more component, their dimension is D+1, where D is the dimension of the feature vector space.

In the remainder of the document reference is made to the vectors $\bar{x}$ and $\bar{y}$, where $\bar{x} = \bar{o}$ and $\bar{y} = \bar{\mu}$. It will be appreciated that the same concepts can be applied to the vectors $\bar{p}$ and $\bar{q}$ by reading $\bar{x} = \bar{p}$ and $\bar{y} = \bar{q}$.

The description focuses on performing operations, such as subtraction, addition, calculating norms, in parallel on a sequential computer. Such operations are, among others, generally used for determining the distance of vectors, being a key step in pattern recognition. In the art of pattern recognition, it is well understood how these key elements can be used in combination with other techniques, such as Hidden Markov Models, to recognise a time-sequential pattern, which is derived from a continual physical quantity. Using such techniques, for each observation vector a vector similarity score, such as a likelihood, between the observation vector and each reference vector of the subset is calculated. For each reference pattern the vector similarity scores of the reference vectors, which represent the reference pattern, are combined to form a pattern similarity score. This is repeated for successive observation vectors. The reference pattern for which an optimum, such as a maximum likelihood, is calculated for the pattern similarity score is located as the recognised pattern. Output means 70 of the system are used for outputting the recognised pattern. This may take various forms, such as displaying the recognised pattern on screen in a textual format, storing the recognised pattern in memory or using the recognised pattern as input, such as a command, for a next processing operation. It is also well understood in the pattern recognition art how techniques, such as a levelled approach, can be used to recognise patterns which comprise a larger sequence of observation vectors than the reference patterns. For instance, it is known how to use sub-word units as reference patterns to recognise entire words or sentences. It is also well understood how additional constraints, such as a pronunciation lexicon and grammar, may be placed on the pattern recognition. The additional information, such as the pronunciation lexicon, can be stored using the same memory as used for storing the reference pattern database.

Conventionally, the processor 30 of FIG. 2 processes the set of data elements in the following way, under control of the program:

One or more data elements are selected from the set of data elements.

Typically, two data elements are selected.

The selected data elements are loaded in separate data registers.

The selected data registers are operated on, e.g. by performing a subtraction, addition or multiplication.

The result may be output (e.g. stored in memory) or used as one of the operands for the next step.

This is repeated until all data elements of the set have been processed.

Figures 4, 5:
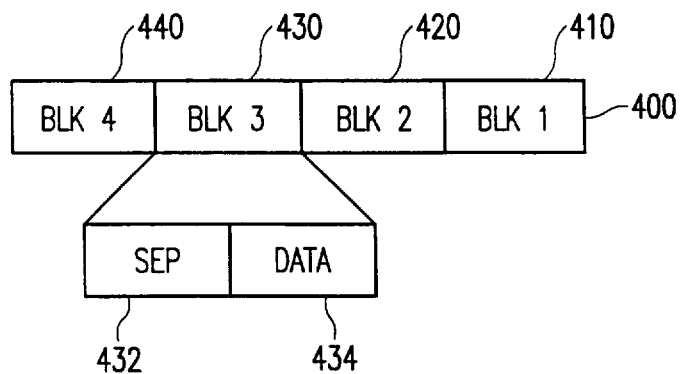
FIG. 4 shows a compound data element with four blocks.
FIG. 5 illustrates setting separation bits.

According to the invention, instead of loading one data element in a separate data register, the processor selects a group of at least two data elements from the set and loads the group of data elements in the data register as a compound data element. FIG. 4 illustrates a compound data element 400. The compound data element is formed by a number of blocks arranged at consecutive block locations of the compound data element. FIG. 4 shows four blocks 410, 420, 430 and 440. The first block 410 is located at the lowest order bit locations of the compound data element 400; whereas the fourth block 440 is located at the highest order bit locations of the compound data element 400. Each block comprises consecutive bit locations and corresponds to a separate one of the data elements of the group. Each block comprises two sub-blocks, being a data sub-block and a separation sub-block. FIG. 4 shows the data sub-block 434 and the separation sub-block 432 for block 430. Each data sub-block comprises the data bits of the corresponding data element. As such the data sub-block comprises at least d bits, where d is the number of data bits of the corresponding data element. The separation sub-block initially comprises at least one bit. As a result of operating on the compound data element, the number of data bits in a block may increase, with a same decrease of the number of separation bits. As will be described later in more detail, for certain operations it is advantageous or required to use more than one separation bit. The separation sub-block is arranged at the high order position of the block, whereas the data sub-block is arranged at the low order position of the block. Using 7-bit data elements and a 32-bit processor, a possible arrangement is to use four blocks, each having seven data bits and one separation bit. On a 64-bit processor, eight of these blocks can be used. Using 8-bit data elements on a 32-bit processor, an arrangement of three blocks can be used. Each block having at least one separation bit. The remaining bits are preferably distributed over the blocks, giving three blocks with two separation bits. The two remaining bits (32−3*(8+2)) may be left unused or assigned to the separation bits of some of the blocks. On a 64-bit processor an arrangement of seven blocks of nine bits (eight data bits and one separation bit) may be used, leaving one bit unused. For 11-bit data elements, two blocks with one to five separation bits are used on a 32-bit processor. On a 64-bit processor, five blocks with one separation bit may be used. If more separation bits are desired, alternatively, four blocks with up to five separation bits may be used. Persons skilled in that art will be able to determine the optimum arrangement for their application. As will be described in more detail later, the separation bits have specific bit values to ensure that the operation performed on the compound data elements gives the desired result.

The data elements may be stored in a memory, such as the memory means 20 of FIG. 2. Advantageously, for a group of data elements the corresponding compound data elements is stored in the memory. This implies that the group of data elements can be loaded as a compound data element simply by reading the compound data element from the memory. Preferably, the data elements of the group are arranged in the memory in such a way that the data elements already form the compound data element, requiring no additional storage for the compound data element. As an example, using 7-bit data elements, the data elements may be stored using 8-bit, thereby creating a separation bit in between the data elements. Preferably, the separation bits are already set to the values required for the specific processing. Obviously, the compound data element may also be stored separate from the data elements. This may be required in situations where fast access to the individual data elements is required (for instance, access to an 11-bit data elements stored in the form of a compound data element with one separation bit may be too slow due to the alignment in the memory).

As an alternative to storing the compound data element in a memory, the compound data element may be formed from the corresponding data elements. To this end the compound data element is constructed in a data register, referred to as the second data register. Preferably, this is the same register as used later on to operate on the compound data element.

For each data element of the group the following steps are performed: the data element is loaded into a first data register, followed by performing a shift of the first or the second data register and terminated by combining the data element stored in the first data register with the compound data element being constructed in the second data register. The combination may be performed using a bit-wise XOR operation. The result is formed in the second data register. The order in which the data elements are loaded, which register is shifted and the number of shift positions may be chosen optimally for the application or type of processor. As an example, on certain processors it is important to shift over as few as possible positions. In such a case it may be beneficial to use for the first data element to be loaded the data element which is going to be located in the high order block of the compound data element. Some modern processors are able to shift data over any number of bits in one cycle (e.g. using a barrel shifter) making the order of loading data elements less relevant. A possible scheme for loading and shifting is to first load the data element to be located at the high order block position of the compound data element. This the first data element may also be loaded directly into the second data register. Next the data element which is to be located at the next lower block position is loaded into the first data register. The second data register is shifted over one block position in the high order direction. Next the data registers are combined, giving the first loaded data element at block position 2 and the last loaded data element at block position 1. This is repeated until all data elements of the group have been loaded. It will be appreciated that on certain processors it may not be necessary to first load the data element into the first data register, but instead it may be possible to combine the data element directly with the second data register. As an alternative to this scheme, each data element in turn may be loaded into the first data register and shifted in the first data register to the required block position before being combined with the second data register.

Preferably the data elements represent positive finite integers. If not, advantageously the data elements are converted to positive finite integers, for instance, by adding $2^{d-1}$ to each data element of the set. As an example, 7-bit data elements ranging from −64 to +63 can be converted to positive 7-bit integers by adding 64 ($2^6$), giving a range of 0 to +127.

The set of data elements may comprise two subsets of data elements with equal numbers of data elements. For instance, the subsets may represent the components of two vectors. A first compound data element corresponds to a group of data elements from the first subset. A second compound data element corresponds to a group of data elements from the second subset. The second compound data element is subtracted from the first compound data element, forming a subtracted compound data element. For a proper 'parallel' subtraction it is required that each block of the subtracted compound data element comprises at the d+1 low order bit positions a value equal to the data element at the same block position in the second compound data element minus the data element at the same block position in the first compound data element. To ensure this, special measures are taken. If no measures were taken a negative result could only be formed in the high order block, since the processor regards the operand as one element. Furthermore, if at a low order block position a negative result needs to be formed, the normal operation of the processor would compensate this by 'borrowing' from a higher order block, disturbing the results in this high order block. It should be noted that by subtracting two elements the data range doubles, requiring d+1 data bits in the subtracted compound data element to represent the data element, instead of d data bits. If only one separation bit was used per block, the subtracted compound data element comprises no separation bits any more. Otherwise, the blocks comprise one less separation bit. It will be clear that the blocks of the subtracted compound data element are arranged at the same bit positions as the blocks of the original compound data elements, but that the blocks comprise one more data bit and one less separation bit than the blocks of the original compound data elements.

The first measure being taken is to ensure that the subtraction as such does not result in negative data elements. This is achieved by adding an offset to each data element of the first compound data element. Advantageously, this is done by setting at least one of the separation bits in each block of the first compound data element to a binary '1' value. As an example, assume that the first subset comprises four data elements $x_1$ to $X_4$, of d bits each and that the second subset comprises four data elements $y_1$ to $y_4$, of d bits each. For the example, it is further assumed that the data elements in the respective compound data elements are separated by two separation bits per block. Setting in each block the d+1-th bit to a binary '1' implies adding $2^d$ to the data element corresponding to that block. Setting the d+2-th bit implies adding $2^{d+1}$. If desired also both separation bits may be set. By ensuring that separation bits of the second compound data element are set to a binary '0' value, it will be clear that the subtraction only results in positive data elements and, therefore, avoids borrowing bits of other blocks. Advantageously, the first and second compound data element have already been formed in advance with the desired values of the separation bits. Alternatively, the separation bits in the first compound data element may be set to a binary '1' using a bit-wise XOR operation with a word-wide mask M. If in the example in each block the d+1-th bit is set to a binary '1', the mask is given by the following formula:

$$M = \sum_{i=1}^{4} 2^{i \cdot (d+1) - 1}$$

FIG. 5 illustrates the use of the mask for this example, where the ⊕ symbol represents a bit-wise XOR operation. Usually, the separation bits of the second compound data element will already have a binary '0' value. If not, the separation bits can be cleared using a bit-wise AND operation with a word-wide mask, where the mask comprises a binary '1' at each location corresponding to a data bit in the compound data element and a binary '0' at each location corresponding to a separation bit in the compound data element.

In the example in each block of the first compound data element the d+1-th bit is set to a binary '1'. After the subtraction it has to be ensured that in each block of the subtracted compound data element the d+1 bit has the desired value. As an example, if $X_4 \geq y_4$, then $x_4 - y_4 \geq 0$. In this case the offset of $2^d$ has to be removed: the subtraction comprises d+1 data bits per data element and since the d+1-th bit is set (offset $2d$) this would otherwise inadvertently indicate a negative value. The offset can be removed by inverting the d+1-th bit from a '1' value to a '0' value. If, however, $X_4 \leq y_4$, then $x_4 - y_4 \leq 0$. In this case during the subtraction the d+1 bit will have been 'borrowed' for forming the result, resulting in the d+1-th bit of the subtracted compound data element being '0'. To ensure that the result is interpreted as being negative, the d+1-th bit of the fourth block of the subtracted compound data element is inverted from a '0' value to a '1' value. Combining the two possibilities in this example, results in that the d+1-th bit of each block of the subtracted compound data element needs to be inverted. This can effectively be achieved by performing a bit-wise XOR operation on the subtracted compound data element using the same mask M as used to set separation bit to '1'. This is illustrated in FIG. 6, where D represents the final compound data element after completion of all steps, with $d_i = x_i - y_i$, for i=1 to 4.

If as an alternative to setting the d+1-th bit in each block of the first compound data element the d+2-th bit is set, the following situation arises. Also here it has to be ensured that after the subtraction in each block of the subtracted compound data element the d+1-th bit has the desired value. If $X_4 \geq y_4$, then no borrowing of the corresponding d+2-th bit occurs during the subtraction. This implies that the d+1-th bit remains '0' and the d+2-th bit remains '1'. Since the d+1-th bit has the desired value, no action is required. Optionally, the d+2-th bit may be reset, for instance using a bit-wise AND operation with an appropriate mask. If $X_4 \leq y_4$ during the subtraction the d+2-th bit will have been 'borrowed' for forming the result. This also results in the d+1-th bit of the subtracted compound data element being '1'. Also here, the d+1 bit automatically gets the desired value, requiring no further action.

It will be appreciated that if both separation bits of a block are set to '1' a combined approach is required. The same applies if a block comprises more than two separation bits, which are set to '1'.

For, for instance, calculating the $L_1$-norm of a vector or the $L_1$-distance of two vectors, defined as:

$$\|\bar{x} - \bar{y}\|_1 = \sum_{i=1}^{D} |x_i - y_i|$$

the absolute value of the vector components needs to be calculated. More in general, negative data elements of the set of data elements need to be converted to the corresponding positive data element. For the following procedure it is assumed that each data element comprises h data bits. As an example, if the procedure is performed directly on a compound data element corresponding to the original data elements then h is d (the number of data bits in the original data element). If the original data element have already been processed than h may differ from d. If, for instance for calculating the $L_1$-distance of two vectors, the two vectors have already been subtracted using the previously described parallel subtraction, then each data element in the blocks of the subtracted compound data element comprise d+1 data bits, where the original vector components comprise d bits.

For the conversion it is assumed that negative numbers are represented using the conventional two's complement representation. On a single data element, a two's complement conversion can be performed by inverting all bits of the data element (a bit-wise XOR operation with a mask with '1'-bits) and a 1-value needs to be added. Here a description is given for a parallel conversion of more than one data element in one operation using a two's complement representation. Persons skilled in the art will be able, based on the description presented here, to perform a parallel conversion for other representations as well. As a first step in the conversion the negative data elements of the compound data element are identified (the positive data element need not be converted). The identification is performed by inspecting the high order bit of each data element in the compound data element. To this end a first mask M1 is used to extract the high order bit of each data element. Assuming that the high order data bit of the compound data element is bit h, the mask M1 comprises for each block of the compound data element a corresponding block, where a value $2^{h-1}$ is stored in the block (for each block of the mask M1 all bits are '0', with the exception of the h-th bit, which is '1'). A bit-wise AND operation is performed on the compound data element with the mask M1. The outcome of this operation is a mask with a '1'-bit in the position of the high order data bit for the negative data elements. By shifting this mask over h-1 bits to the low order direction (which is the same as dividing the mask by $2^{h-1}$) a mask M2 is formed with a '1'-bit in the position of the low order data bit for the negative data elements. By multiplying M2 by $2^h-1$ a mask M3 is formed, where all data bits in the blocks, which correspond to a negative data element, are set to '1'. This is illustrated in FIG. 7. Here a compound data element D is shown with four blocks. The blocks respectively comprise a data element with the value $d_1, d_2, d_3, d_4$. For simplicity no separation bits are shown in the figure. As described before, if D is formed by subtracting two compound data elements with one separation bit per block, then the blocks of D no longer have any separation bits. For clarity, the high order bits of the data elements are shown separately in FIG. 7. In the example, $d_2$ and $d_4$ are positive, whereas $d_1$ and $d_3$ are negative. For the positive data elements the high order data bit is '0' and the low order data bits comprise the actual value, as shown in the figure. For the negative data elements, the high order data bit is '1' and the low order data bits comprise the actual value plus $2^{h-1}$.

FIG. 8 illustrates the actual conversion. First all data bits of the compound data element D are inverted by performing a bit-wise XOR operation with mask M3. Next, a value 1 is added to each data element by adding mask M2. In this way a parallel two's complement conversion has been performed.

The calculation of the $L_1$-norm can now be completed by extracting the data elements from the resulting compound data element and adding up the extracted data elements. More in general, an $L_r$-norm can be calculated by extracting the data elements from the compound data element comprising the vector components, raising the extracted data elements to the power r, adding up the raised data elements. After all data elements have been processed the resulting sum may be raised to the power 1/r, if required. The extraction may, for instance, be performed by means of a bit-wise AND operation on the compound data element with a mask in which the h low order bits have been set to a binary '1'. Next the compound data element may be shifted in the low order direction over the size in bits of one block.

If extracting and processing each data element separately requires too much processing, it is advantageous to extract a data unit with a group of consecutive data elements from the compound data element in one operation and to use a table to determine a sub-norm for the data elements in the data unit. As an example, if a compound data element comprises four data elements $d_1 \ldots d_4$, it may be advantageous to extract two data units, the first one comprising $d_4$ and $d_3$, the second one comprising $d_2$ and $d_1$. If the compound data element is formed by subtracting compound data elements with 7-bit data elements, then the data elements $d_1 \ldots d_4$ each comprise eight data bits, forming 16-bit data units. In such a case, a table can be used with $2^{16}$ entries providing the $L_r$-subnorm for the combination of $d_{2i+1}$ and $d_{2i+2}$ (i=0 to 1). As an example, the table may store the $L_1$-subnorm $|d_{2i+1}|+|d_{2i+2}|$. If the data elements $d_1 \ldots d_4$ have already been converted to positive data elements, then the table may store $d_{2i+1}+d_{2i+2}$. In the last case, the table may also have less entries, since the high order bit of the data elements is not used. It is then advantageous to only extract 15 bits for the data unit, ignoring the high order bit of d4 and d2. For the $L_2$-subnorm the table may store $d_{2i+1}^2+d_{2i+2}^2$, reducing the processing requirements for the $L_2$ norm even further.

Instead of or in addition to subtracting or converting data elements, it may be desired to add up the data elements. For example, for calculating an $L_1$-norm of a vector, the normalised vector components need to be added up. A parallel addition is achieved by arranging the data elements in at least two groups of data elements. Assuming two groups of data elements, for both groups a corresponding compound data element is loaded into a selected data register. The two data registers are added up forming a compound sum. Due to the addition the data range doubles, requiring one more data bit per data element. Therefore, in order to avoid overflow from a data element to a neighbouring higher order data element, each block of the compound data elements comprises at least one separation bit, set to a binary '0' value. If only one separation bit is used per block, only two compound data elements can be added in this way. Similarly, if s separation bits are used per block $2^s$ compound data elements can be added together without causing an overflow. If in this way more than two compound data elements can be added up, preferably a temporary compound sum is formed in a second data register. All compound data elements are loaded in sequence into a first data register and added to the second data register. When all compound data elements have been processed in this way, the temporary sum is used as the compound sum. It will be clear that the blocks of the compound sum are arranged at the same bit positions as the blocks of the original compound data elements, but that the blocks comprise more data bits and less separation bits than the blocks of the original compound data elements.

FIG. 9 illustrates an example of a vector comprising 16 components $x_1$ to $x_{16}$. In the example, four blocks fit into one computer word, with each block comprising a component (data element) and two separation bits. In this way four compound data elements $X_1$ to $X_4$ represent the entire vector. In three parallel additions, a compound sum S with four blocks is formed. The additions may be performed by first forming a sum by adding $X_1$ and $X_2$, then adding $X_3$ to the sum, followed by adding $X_4$ to the sum. Alternatively a first sum is formed by adding $X_1$ and $X_2$, a second sum is formed by adding $X_3$ and $X_4$, and finally the final sum is formed by adding both sums together. Similarly as described before, the four blocks of the final sum S may be extracted and added up, resulting in three more additions. In this way a total of six additions are required, instead of 15 conventionally. Alternatively, a table may be used to determine the sum of the blocks of the compound sum. It will be appreciated that the total number of data elements may not ideally suit the distribution over the compound data elements. In this example, such a situation would, for instance, arise if the vector comprised 17 or 15 components. It will be appreciated that various approaches are possible to deal with these situations. One approach is to complement the last compound data element, which has 'empty' blocks, with dummy data elements. Preferably, data elements with the value 0 are used. If a first processing step would be to subtract vectors then, obviously, any dummy value may be used as long as the value is used consistently. As an alternative to a dummy value, the last data element may be handled separately by ignoring the unused blocks.

Particularly in a situation where a relatively large number of data elements needs to be added together, normally many separation bits would be required to avoid overflow. This may imply that less data elements fit into a compound data element, reducing the effectiveness of the parallel addition. In such a situation it is beneficial to start with only a few separation bits per block of the compound data element. If at a certain moment during the addition process all separation bits have been fully used (and a next addition might result in an overflow), the compound data element is split into at least two compound data elements in order to create more separation bits. FIG. 10 illustrates an example of splitting a compound data element X with eight blocks $x_1$ to $x_8$ in compound data elements $X_1$ and $X_2$. The blocks of $X_1$ and $X_2$ are twice as large as the blocks of X. Initially, the extra bits in $X_1$ and $X_2$ are used as separation bits and during the additions may get used as data bits. The splitting may be performed as follows. First a copy is made of X, forming $X_2'$, being the basis of $X_2$. Next, blocks are removed from X at alternating block positions, forming $X_1$. In the example blocks $x_8$, $x_6$, $x_4$ and $x_2$ are removed. Next, the other blocks ($x_7$, $x_5$, $x_3$ and $x_1$) are removed from $X_2'$. Preferably, this is followed by shifting $X_2'$ in the low order direction over one block position forming $X_2$. It will be appreciated that if sufficient high order bits are available in X, which are not allocated to a block yet, then these bits could be used as separation bits for the block in $X_2$, which comprises x8. In this case, it is also possible to shift $X_1$ over one block position in the high order direction.

As described earlier, a total sum can be calculated from a compound sum by extracting and adding up components or using a table. Alternatively, the following method is used which is illustrated in FIG. 11, starting with a compound data element $X_1$ with eight components $x_1 \ldots x_8$. In this method iteratively new compound data elements are formed of which less data elements are used, until finally the last compound data element comprises only one data element which is used and comprises the final sum. The process starts with copying the compound data element $X_1$ to a second compound data element $X_2$. Next, $X_1$ or $X_2$ is shifted over, preferably, half of the number of blocks. Both directions of shifting are possible as long as the same direction is used during the process. As will be clear from the example, it is advantageous to shift in the low order direction, resulting in the total sum being formed in the low order position. In the example of FIG. 11, $X_2$ is shifted over four block positions in the low order direction. Next, $X_1$ and $X_2$ are added together forming $X_3$. Of $X_3$ only the four low order block positions are relevant. Repeating the process starting with $X_3$, a copy and shift (now over two block positions) gives $X_4$. Adding $X_3$ to $X_4$ gives $X_5$. Of $X_5$ only the two low order block positions are relevant. Repeating the process starting with $X_5$, a copy and shift (now over one block position) gives $X_6$. Adding $X_5$ to $X_6$ gives $X_7$. The low order block position of $X_7$ comprises the desired sum, which can be extracted using a bit-wise AND operation. It will be appreciated that this process performs optimally if the number of data elements in the starting compound data element is a power of 2. If this is not the case, various alternative approaches are possible.

FIG. 12 illustrates the situation where the starting compound data element $X_1$ comprises seven data elements. A number M is determined, which is substantially half of seven. Both three or four are suitable choices. In this example, three is chosen. A copy is made and shifted over three block positions, forming $X_2$. If $X_1$ and $X_2$ would be added together, data element $X_4$ would be represented twice. This can be avoided by removing one of the $x_4$ data elements from either $X_1$ or $X_2$. Preferably, $x_4$ is removed from $X_1$ together with $x_7$, $x_6$ and $x_5$, resulting in removing all unused data elements from the sum. This approach may be repeated whenever the number of effective data elements is odd.

FIG. 13 illustrates a preferred approach, in which in one step the number of effective data elements is reduced to a power of 2. To this end the largest power of 2 which is still smaller than the number of data elements in the starting compound data element $X_1$ is determined. In FIG. 13, $X_1$ comprises 10 data elements. The largest power of two smaller than 10 is 8. To form $X_2$, $X_1$ is copied and shifted to the low order direction over eight block positions. $X_3$ is formed by adding $X_1$ and $X_2$ together. The eight low order blocks of $X_3$ are relevant.

As described earlier, the $L_2$-distance of two vectors $\bar{x}$ and $\bar{y}$ can be calculated by subtracting the vectors and extracting the components of the resulting subtracted vector or using a table. Advantageously, the following parallel method is used to calculate the $L_2$-distance. Considering that:

$$\|\bar{x} - \bar{y}\|_2^2 = \|\bar{x}\|_2^2 - 2 \cdot \sum_{i=1}^{D} x_i y_i + \|\bar{y}\|_2^2,$$

where $$\bar{x} = (x_1, x_2, \ldots, x_D)^T, \text{ and } \bar{y} = (y_1, y_2, \ldots, y_D)^T$$

and considering further that, particularly for pattern recognition, $\bar{y}$ is a predetermined reference vectors, whose $L_2$-norm can be calculated in advance, and that $\bar{x}$ is an observation vector, whose $L_2$-norm can be calculated once for each new observation, this implies that only the term with the sum needs to be calculated for every combination of the observation vector with the reference vectors. This sum can be calculated in parallel using the following method. A first compound data element $C_1$ corresponds to data elements of one of the vectors. In the example $C_1$ correspond to data elements of $\bar{x}$. Successive blocks of $C_1$ correspond to successive data elements of $\bar{x}$. In the example shown in FIG. 14, $C_1$ comprises the first four data elements of $\bar{x}$, being $x_1$, $x_2$, $x_3$ and $x_4$. A second compound data element $C_2$ corresponds to data elements of the other vector, in the example $\bar{y}$. Successive blocks of $C_2$ correspond to successive data elements of $\bar{y}$ in reverse order. In the example shown in FIG. 14, $C_2$ comprises the first four data elements of $\bar{y}$ in reverse order, giving $y_4$, $y_3$, $y_2$ and $y_1$. Note that in the figures the first block of a compound data element is shown right, indicating the low order position. In the example it is assumed that the low order block of $C_1$ comprises $x_1$ and that the low order block of C comprises $y_4$. As will be clear a similar result can be achieved if both orders are reversed. Each block of the compound data element $C_1$ and $C_2$ comprises at least d separation bits, where d is the size in bits of the data elements of the vectors. In the example four blocks per compound data element are used, making it advantageous to use d+2 separation bits per block as will be described in more detail later on. All separation bits are set to '0'. FIG. 14 shows the compound data element $C_3$, which is formed by multiplying $C_1$ and $C_2$. In the example, the low order block of $C_3$ comprises the value $x_1$, times $y_4$, which is the result of the multiplication of the low order blocks of $C_1$ and $C_2$. By using at least d separation bits, no interference of higher order blocks occurs. The second order block of $C_3$ comprises the cross product $x_2$ times $y_4$, plus $x_1$ times $y_3$. Similarly, the other blocks of $C_3$ comprise cross products. Due to the arrangement of the data elements in reverse order, the fourth block comprises the desired cross product $x_1 \cdot y_1 + x_2 \cdot y_2 + x_3 y_3 + x_4 y_4$. It will be appreciated that due to the fact that some cross products comprise more than one term, extra separation bits may be required to avoid interference between blocks. In the example, the second block requires a minimum of d+1 separation bits, the third and the fourth block d+2 separation bits. It will be appreciated that subsequent blocks of a compound data element may in principle comprise different numbers of bits, as minimally required per block to avoid interference. In order to obtain the desired cross-product, corresponding blocks of $C_1$ and $C_2$ must have equal numbers of bits. Advantageously, all blocks of $C_1$ and $C_2$ are equal size. In the example, a suitable size is 2d+2 bits, being d data bits plus d+2 separation bits. As is also clear from the example, the multiplied compound data elements $C_3$ comprises more blocks than $C_1$ and $C_2$. In general, if $C_1$ and $C_2$ comprise k data blocks, then $C_3$ comprises 2k-1 data blocks. Since typically $C_1$, $C_2$ and $C_3$ will be equal size, this implies that k-1 high order blocks of $C_1$ and $C_2$ are left unused and are set to a binary '0' value. As is clear from the example, the k-th block of $C_3$ comprises the desired cross-product. The cross product can be obtained from the $C_3$ by extracting the k-th block. The extracting may be performed by shifting $C_3$ over k-1 blocks in the low-order direction and performing a bit-wise AND operation with a mask with '1'-bits in the position of the low-order block of $C_3$.

In a further embodiment, the processor 30 of FIG. 2 comprises a floating point processing unit 36 with floating point data registers 38. Advantageously the floating point unit 36 is used to perform the multiplication, since on modern processors a floating point multiplication is typically performed in less cycles than an integer multiplication. On processors with a relatively small wordsize for integers (e.g. 32 or less bits), this has a further advantage that floating point numbers usually are larger (double precision floating point numbers typically have a mantissa of 52 bits). To this end, the two compound data elements $C_1$ and $C_2$ are loaded into the mantissa (fraction) of individual floating point data registers. The multiplication is then performed by instructing the processor to perform a floating point multiplication on the data loaded in the two registers.

When using the floating point unit 36 of the processor 30, advantageously the floating point data registers 38 are used in such a way that extracting the k-th block of $C_3$ is simplified. This can be achieved by setting the exponent of one of the floating point data registers, comprising $C_1$ or $C_2$, to a suitable power of 2. Since no overflow of the mantissa occurs during the multiplication, the same exponent value is transferred to $C_3$. By converting $C_3$ to an integer an implicit shift is performed. Advantageously, the exponent is set to $2^{-i}$, where i is the number of bits comprised by the k-1 low order blocks of $C_3$. In this way, the conversion to an integer results in shifting the k-th block to the low order position of $C_3$ (in an integer format). The extraction can then be completed by performing a bit-wise AND operation with a mask with '1'-bits in the position of the low-order block of $C_3$. It will be appreciated that on certain systems it may be faster to perform the conversion to an integer implicitly by storing $C_3$ as a floating point number in a memory and reading $C_3$ back as an integer.

Summarising, the method and system are used to process a set of data elements, such as components of vectors used in pattern recognition, in parallel on a conventional sequential processor 30. A group of data elements is loaded into a data register of the processor 30 as a compound data element. The data register is operated on using a conventional processor instruction, such as an addition, subtraction or multiplication. The compound data element comprises an arrangement of at least two blocks, with each block comprising at the low order bit positions a data element and at the high order bit position(s) at least one separation bit. The separation bits are assigned predetermined bit values ensuring that during a processor operation the desired parallel result is formed. As such, the invention can be used on conventional sequential processors, usually characterised as Single Instruction, Single Data (SISD) processors. To achieve higher levels of performance, the SISD processor may be implemented using various forms of 'parallel' processing, such as, for instance used, for superscalar processors. With such implementations the processor still remains a sequential processor at instruction level. Applying the invention on a SISD processor results in more or less simulating a Single Instruction, Multiple Data (SIMD) processor. It will be appreciated that the invention may also be applied on SIMD processors by constructing each of the data elements of one operand of an SIMD processor according to the invention. This achieves a second level of parallel operation on an SIMD processor. The invention may also be applied on a third category of processor, referred to as Multiple Instruction, Multiple Data (MIMD) processors, such as VLIW (very large instruction word) processors. For MIMD processors, typically, each of the multiple instructions relates to one single data stream. It will be appreciated that invention can be applied to such a data stream as well.

I claim:

1. A method for processing a set of data elements in a computer system comprising a sequential processor; each data element comprising a plurality of d data bits; the processor operating on an instruction-specific number of operands stored in individual ones of a plurality of data registers; at least one operand having a width of w bits; said method comprising:

a. selecting at least one data element from the set of data elements, b. for each selected data element selecting one of the data registers and loading the selected data element into the selected data register, c. instructing the processor to operate on the selected data register(s), and d. repeating steps a. to c. until all data elements of the set have been operated on, characterised in that:

step a. comprises selecting at least one group of at least two distinct data elements from the set of data elements; and step b. comprises for each selected group selecting an individual one of the data registers, and loading the data elements of the group as a compound data element into the selected data register; the compound data element comprising for each data element of the group a corresponding block of at least d+s consecutive bits; the blocks being arranged at consecutive block locations of the compound data element and of each block d low order bit locations comprising the data bits of the corresponding data element and at least s high order bit locations comprising separation bits, each with a predetermined bit value, where $(d+s)*2 \leq w$.

2. A method as claimed in claim 1, wherein the data elements represent finite integers, characterised in that the method comprises the step of converting the data elements of the set into finite positive integers by adding $2^{d-1}$ to each data element of the set.

3. A method as claimed in claim 1, wherein the computer system comprises memory means and the data elements being stored in the memory means, characterised in that for at least one group the compound data element is stored in the memory means and that loading the data elements of the group as a compound data element into the selected data register comprises reading the compound data element from the memory means into the selected data register.

4. A method as claimed in claim 1, characterised in that the method comprises constructing the compound data element from the data elements of the corresponding group by:
   for each data element of the group:
   loading the data element into a first data register,
   repositioning the data element in the first data register or a temporary compound data element stored in a second data register over at least d+s bit positions, and
   combining the data element with the temporary compound data element in the second data register; and
   using the temporary compound data element as the compound data element.

5. A method as claimed in claim 1, wherein the set of data elements comprises a first and second subset of data elements, the first and second sub-set comprising equal numbers of data elements, characterised:
   in that a first compound data element corresponds to a group of data elements of the first subset of data elements, with an offset being added to each data element by at least one separation bit of each block of the first compound data element being set to a binary '1' value;
   in that a second compound data element corresponds to a group of data elements of the second subset of data elements with the separation bits of each block of the second compound data element being set to a binary '0' value; and
   in that the processor is instructed to form a subtracted compound data element by subtracting a data register loaded with the second compound data element from a data register loaded with the first compound data element; the subtracted compound data element comprising an arrangement of blocks corresponding to the arrangement of blocks of the first and second compound data element, with each block of the subtracted compound data element comprising at least one more data bit and at least one less separation bit than the corresponding block of the first and second compound data element.

6. A method as claimed in claim 5, characterised in that setting the separation bits of a compound data element comprises instructing the processor to perform a bit-wise XOR operation on the compound data element with a predetermined mask of w bits.

7. A method as claimed in claim 5, characterised in that the method comprises selectively converting negative data elements of the subtracted compound data element to corresponding positive data elements.

8. A method as claimed in claim 7, wherein negative numbers are represented in a two's complement representation, characterised in that the conversion comprises:
   identifying which data elements of the subtracted compound data element are negative, by:
   instructing the processor to perform a bit-wise AND operation on the subtracted compound data element with a first mask of w bits; the first mask comprising an arrangement of blocks corresponding to the arrangement of blocks of the subtracted compound data element, with of each block of the first mask the d+1-th bit being set to a binary '1' value and the remaining bits being set to a binary '0' value; and
   instructing the processor to divide a resulting compound data element by $2^d$, forming a second mask of w bits; and
   converting the data elements of the subtracted compound data element, by:
   instructing the processor to calculate a third mask, being the second mask multiplied by $2^d 1-1$; and
   instructing the processor to perform a bit-wise XOR operation on the subtracted compound data element and the third mask, followed by adding up the second mask.

9. A method as claimed in claim 5, wherein the first and second subset of data elements represent respectively a first and second vector and wherein the method comprises calculating an $L_r$-distance between the first and second vector, characterised in that the distance calculation comprises:
   extracting each data element from the subtracted compound data element;
   raising the extracted data elements to the power r and forming a sum by adding up the raised data elements.

10. A method as claimed in claim 5, wherein the computer system comprises memory means; the first and second subset of data elements represent, respectively, a first and second vector; and wherein the method comprises calculating an $L_r$-distance between the first and second vector, characterised in that the calculation comprises:
   extracting a data unit from the subtracted compound data element; the data unit comprising at least the data bits of a plurality of consecutive blocks; and
   accessing a table stored in the memory means to retrieve an $L_r$ sub-norm for the data elements corresponding to the data bits which are part of the extracted data unit.

11. A method as claimed in claim 1, characterised in that the method comprises:
   selecting a plurality of said groups from the set;
   instructing the processor to calculate a compound sum by:
   for each group:
   loading the data elements of the group as a group-specific compound data element into a selected data register, with the separation bits of each block of the group-specific compound data element being set to a binary '0' value; and
   instructing the processor to add the selected data register to a data register comprising a temporary compound sum; the temporary compound sum being a compound data element comprising an arrangement of blocks corresponding to the arrangement of blocks in the group-specific compound data elements, with each block of the subtracted compound data element comprising at least one more data bit and at least one less separation bit than the corresponding block of the group-specific compound data elements; and using the temporary compound sum as the compound sum.

12. A method as claimed in claim 11, characterised in that the method comprises creating more separation bits by splitting a compound data element into at least a first and a second compound data element.

13. A method as claimed in claim 12, characterised in that splitting the compound data element into the first and the second compound data element comprises:

copying the compound data element to the second compound data element;

forming the first compound data element by removing blocks from the compound data element at a first selection of alternating block positions;

removing blocks from the second compound data element at a second selection of alternating block positions; the second selection being complementary to the first selection; and shifting the first compound data element or the second compound data element over one block position.

14. A method as claimed in claim 11, characterised in that the method further comprises calculating a total sum by extracting the blocks of the compound sum and adding up the extracted blocks.

15. A method as claimed in claim 11, characterised in that the method further comprises calculating a total sum; the calculation comprising:

determining the number n of blocks in the compound sum;

determining an integer number m which is substantially half of n;

copying the compound sum to a second compound sum;

shifting the compound sum or the second compound sum over m block positions in a first direction; and summing the compound sum and the second compound sum to form a new compound sum with less data elements.

16. A method as claimed in claim 11, wherein the computer system comprises memory means, characterised in that the method further comprises calculating a total sum by:

extracting a data unit from the compound sum; the data unit comprising a plurality of consecutive blocks; and accessing a table stored in the memory means to retrieve a sum of the data elements which are part of the extracted data unit.

17. A method as claimed in claim 1, wherein the set of data elements comprises a first and second sub-set of data elements; the first and second subset comprising equal numbers of data elements and representing, respectively, a first and second vector; and the method comprising calculating an $L_2$-distance between the first and second vector, characterised:

in that a first compound data element corresponds to a group of k successive data elements of the first sub-set of data elements, with successive blocks of the first compound data element corresponding to successive data elements, and the number of separation bits in the blocks being at least d and the separation bits being set to a binary '0' value;

in that a second compound data element corresponds to a group of k successive data elements of the second set of data elements, with successive blocks of the second compound data element corresponding to successive data elements in reverse order, and the number of separation bits in the blocks being at least d and the separation bits being set to a binary '0' value;

in that the calculation comprises:

instructing the processor to multiply a data register loaded with the first compound data element with a data register loaded with the second compound data element, forming a multiplied compound data element; and extracting the k-th block from the multiplied compound data element.

18. A method as claimed in claim 17, characterised:

in that the processor comprises a plurality of floating point data registers;

in that the first and second compound data element are loaded into the mantissa of individual ones of the floating point data registers and in that the processor is instructed to form a multiplied compound data element by performing a floating point multiplication on the floating point registers loaded with the first and second compound data element.

19. A method as claimed in claim 18, characterised in that extracting the k-th block of the multiplied compound data element comprises:

while loading the first or second compound data element in the floating point data register, setting the exponent to $2^{-n}$, where n is the number of bits of the k−1 low order blocks of the multiplied compound data element;

converting the multiplied compound data element to an integer value; and extracting the low-order block from the integer value by masking.

20. A computer system for processing a set of data elements; each data element comprising a plurality of d data bits; the system comprising memory means and a sequential processor operating on an instruction-specific number of operands stored in individual ones of a plurality of data registers; at least one operand having a width of w bits; the processor being operative to perform the following steps under control of a program stored in the memory means:

a. selecting at least one data element from the set of data elements, b. for each selected data element selecting one of the data registers and loading the selected data element into the selected data register, c. operating on the selected data register(s), and d. repeating steps a. to c. until all data elements of the set have been operated on, characterised in that:

step a. comprises selecting at least one group of at least two distinct data elements from the set of data elements; and step b. comprises for each selected group selecting an individual one of the data registers, and loading the data elements of the group as a compound data element into the selected data register; the compound data element comprising for each data element of the group a corresponding block of at least d+s consecutive bits; the blocks being arranged at consecutive block locations of the compound data element and of each block d low order bit locations comprising the data bits of the corresponding data element and at least s high order bit locations comprising separation bits, each with a predetermined bit value, where $(d+s)*2 \leq w$.

21. A computer system as claimed in claim 20, wherein the data elements are stored in the memory means, characterised in that for at least one group the compound data element is stored in the memory means and that loading the data elements of the group as a compound data element into the selected data register comprises reading the compound data element from the memory means into the selected data register.

22. A computer system as claimed in claim 20, wherein the set of data elements comprises a first and second subset of data elements, the first and second subset comprising equal numbers of data elements, characterised:

in that a first compound data element corresponds to a group of data elements of the first subset of data elements, with at least one separation bit of each block of the first compound data element being set to a binary '1' value;

in that a second compound data element corresponds to a group of data elements of the second subset of data elements with the separation bits of each block of the second compound data element being set to a binary '0' value; and in that the processor is operative to form a subtracted compound data element by subtracting a data register loaded with the second compound data element from a data register loaded with the first compound data element; the subtracted compound data element comprising an arrangement of blocks corresponding to the arrangement of blocks of the first and second compound data element, with each block of the subtracted compound data element comprising at least one more data bit and at least one less separation bit than the corresponding block of the first and second compound data element.

23. A computer system as claimed in claim 22, wherein negative numbers are represented in a two's complement representation, characterised in that the processor is operative to selectively convert negative data elements of the subtracted compound data element to corresponding positive data elements; the conversion comprising:

identifying which data elements of the subtracted compound data element are negative, by:

performing a bit-wise AND operation on the subtracted compound data element with a first mask of w bits; the first mask comprising an arrangement of blocks corresponding to the arrangement of blocks of the subtracted compound data element, with of each block of the first mask the d+1th bit being set to a binary '1' value and the remaining bits being set to a binary '0' value; and performing a bit-wise AND operation on the compound data element with a first mask of w bits; the first mask comprising for each block of the compound data element a corresponding block, where a value $2^{d-1}$ is stored in d low order bit locations of the block and the s separation bits of the block have a binary '0' value; and dividing a resulting compound data element by $2^d$, forming a second mask of w bits; and converting the data elements of the subtracted compound data element, by:

calculating a third mask, being the second mask multiplied by $2^{d+1}-1$; and performing a bit-wise XOR operation on the subtracted compound data element and the third mask, followed by adding up the second mask.

24. A computer system as claimed in claim 22, wherein the first and second subset of data elements represent, respectively, a first and second vector; and wherein the processor is operative to calculate an $L_r$-distance between the first and second vector, characterised:

in that the memory means stores a table with $L_r$ sub-norms for a sequence of a predetermined number of data elements; and in that the distance calculation comprises:

extracting a data unit with at least the data bits of the predetermined number of consecutive blocks from the subtracted compound data element; and accessing the table to retrieve an $L_r$ sub-norm for the data elements corresponding to the data bits which are part of the extracted data unit.

25. A computer system as claimed in claim 20, characterised in that the processor is operative to:

select a plurality of said groups from the set;

calculate a compound sum by:

for each group:

loading the data elements of the group as a group-specific compound data element into a selected data register, with the separation bits of each block of the group-specific compound data element being set to a binary '0' value; and adding the selected data register to a data register comprising a temporary compound sum; the temporary compound sum being a compound data element comprising an arrangement of blocks corresponding to the arrangement of blocks in the group-specific compound data elements, with each block of the subtracted compound data element comprising at least one more data bit and at least one less separation bit than the corresponding block of the group-specific compound data elements; and using the temporary compound sum as the compound sum.

26. A computer system as claimed in claim 25, characterised in that the processor is operative to create more separation bits by splitting a compound data element into a first and a second compound data element; the splitting comprising:

copying the compound data element to the second compound data element;

forming the first compound data element by removing blocks from the compound data element at a first selection of alternating block positions;

removing blocks from the second compound data element at a second selection of alternating block positions; the second selection being complementary to the first selection; and shifting the first compound data element or the second compound data element over one block position.

27. A computer system as claimed in claim 25, characterised in that the processor is operative to calculate a total sum by:

determining the number n of blocks in the compound sum;

determining an integer number m which is substantially half of n;

copying the compound sum to a second compound sum;

shifting the second compound sum over m block positions in a first direction; and summing the compound sum and the second compound sum to form a new compound sum with less data elements.

28. A computer system as claimed in claim 20, wherein the set of data elements comprises a first and second sub-set of data elements; the first and second subset comprising equal numbers of data elements and representing, respectively, a first and second vector; and the processor being operative to calculate an $L_2$-distance between the first and second vector, characterised:

in that a first compound data element corresponds to a group of k successive data elements of the first sub-set of data elements, with successive blocks of the first compound data element corresponding to successive data elements, and the number of separation bits in the blocks being at least d and the separation bits being set to a binary '0' value;

in that a second compound data element corresponds to a group of k successive data elements of the second set of data elements, with successive blocks of the second compound data element corresponding to successive data elements in reverse order, and the number of separation bits in the blocks being at least d and the separation bits being set to a binary '0' value;

in that the calculation comprises:

multiplying a data register loaded with the first compound data element with a data register loaded with the second compound data element, forming a multiplied compound data element; and extracting the k-th block from the multiplied compound data element.

29. A computer system as claimed in claim 28, characterised in that the processor is of a type suitable for performing floating point operations and comprising a plurality of floating point data registers; in that the first and second compound data element are loaded into the mantissa of individual ones of the floating point data registers and in that the processor is instructed to form a multiplied compound data element by performing a floating point multiplication on the floating point registers loaded with the first and second compound data element.

30. A computer system as claimed in claim 29, characterised in that extracting the k-th block of the multiplied compound data element comprises:

while loading the first or second compound data element in the floating point data register, setting the exponent to $2^{-n}$, where n is the number of bits of the k−1 low order blocks of the multiplied compound data element;

converting the multiplied compound data element to an integer value; and extracting the low-order block from the integer value by masking.

* * * * *